L. C. ZEGA.
SELF JACKING VEHICLE.
APPLICATION FILED MAY 1, 1915.
1,166,398.
Patented Dec. 28, 1915.
2 SHEETS—SHEET 1.
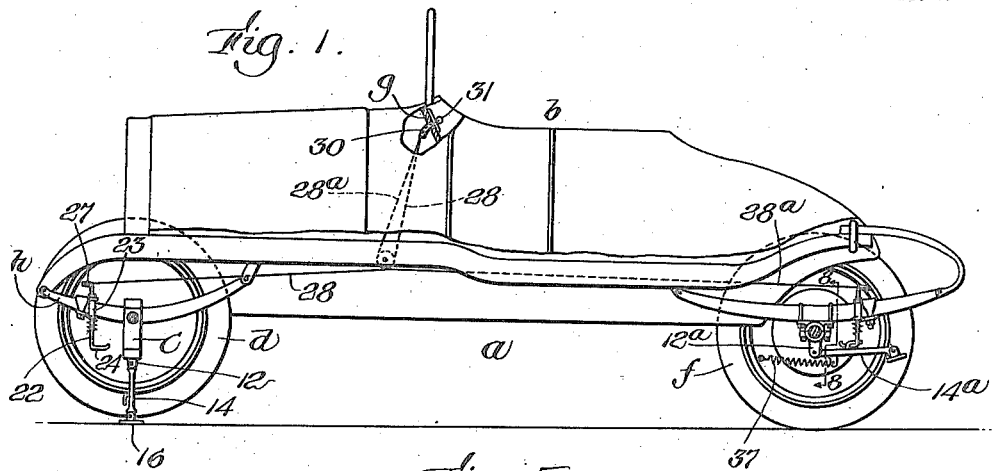
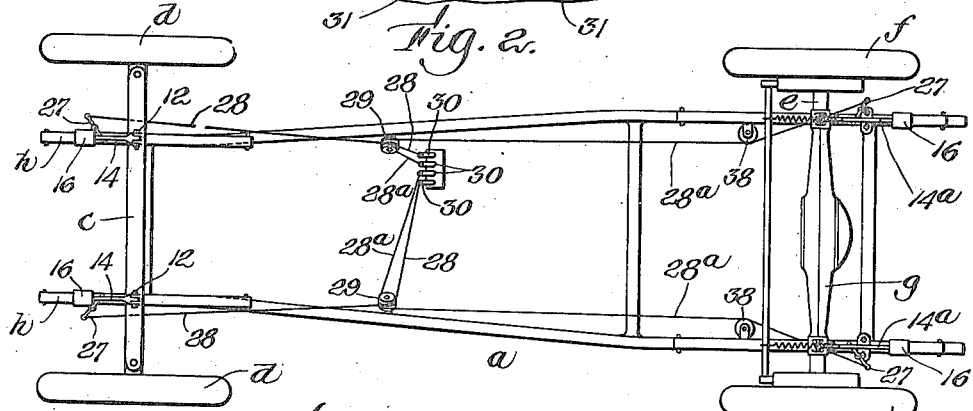
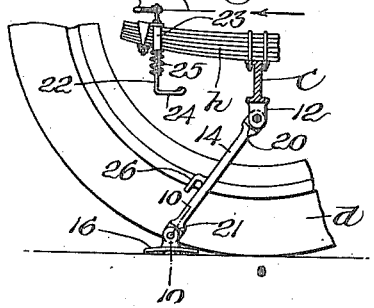
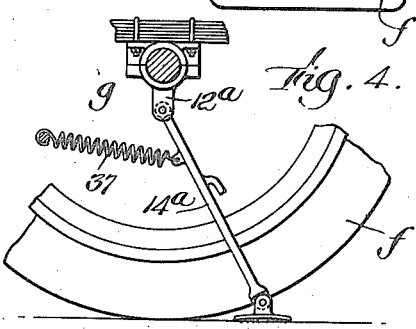
Inventor:
Louis C. Zega

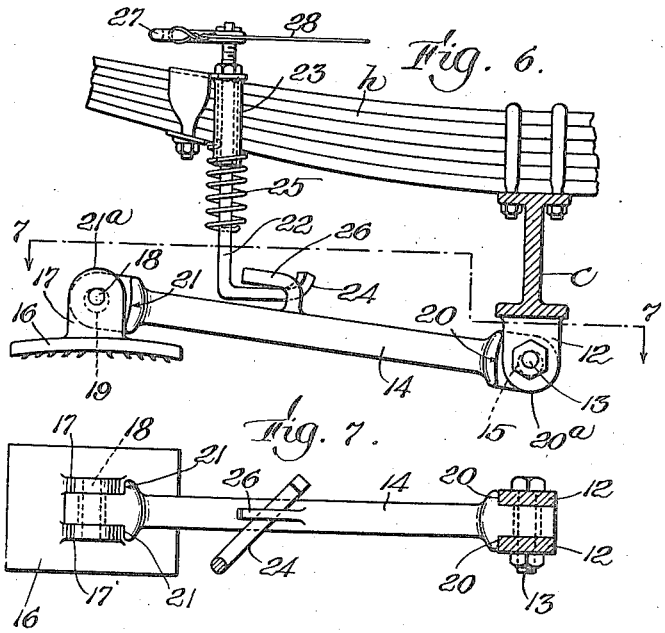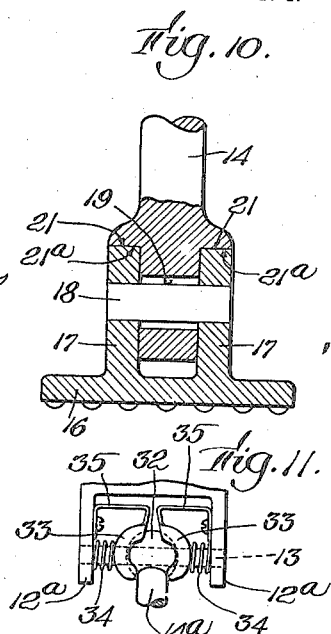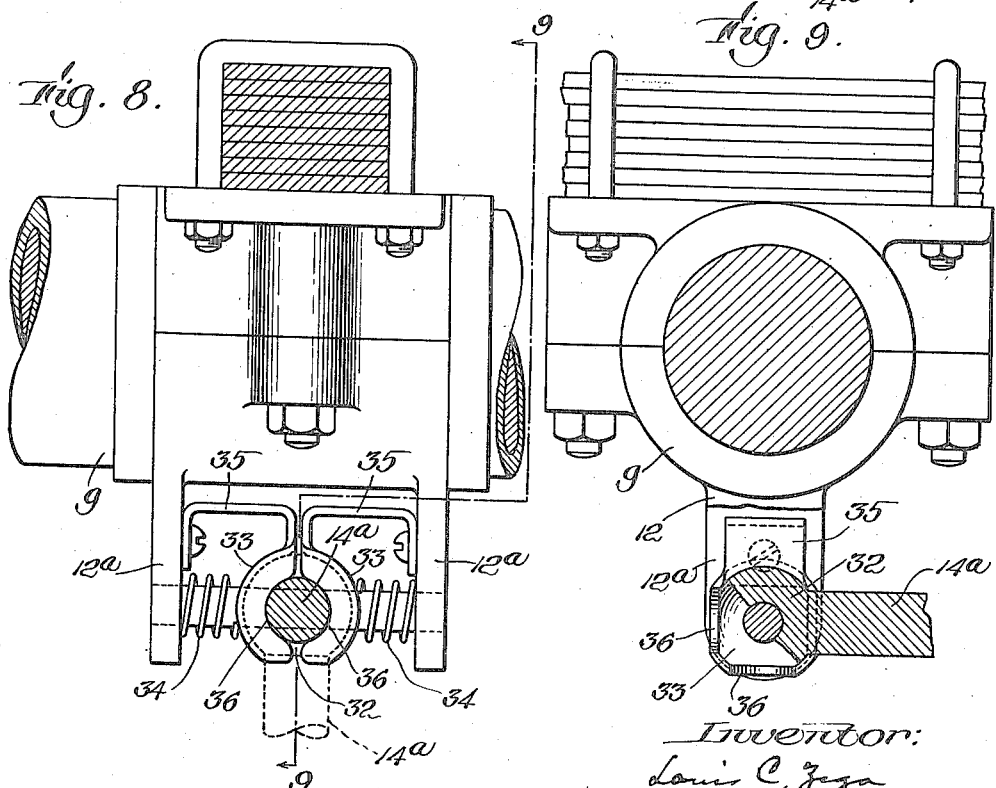

UNITED STATES PATENT OFFICE.

LOUIS C. ZEGA, OF WEST EVERETT, MASSACHUSETTS, ASSIGNOR TO AMELIA F. PRAY, OF EVERETT, MASSACHUSETTS.

SELF-JACKING VEHICLE.

1,166,398.　　　　　Specification of Letters Patent.　　Patented Dec. 28, 1915.

Application filed May 1, 1915. Serial No. 25,305.

*To all whom it may concern:*

Be it known that I, LOUIS C. ZEGA, a subject of the King of Italy, and resident of West Everett, in the county of Middlesex and State of Massachusetts, have invented certain new and useful Improvements in Self-Jacking Vehicles, of which the following is a specification.

This invention relates to a wheeled vehicle provided with an oscillatory strut hinged or jointed at one end to the base frame of the vehicle and adapted to bear at the opposite end on the ground in an inclined position, the jack being operable to raise an adjacent wheel of the vehicle from the ground by a movement of the vehicle subsequent to the placing of the lower end of the strut upon the ground.

The invention has for its object first to provide an improved construction of the jack, and secondly to provide means under control of the driver of the vehicle whereby one or more jacks with which the vehicle is provided may be released and allowed to drop into operative position upon the ground.

The invention consists in the improvements which I will now proceed to describe and claim.

Of the accompanying drawings forming a part of this specification: Figure 1 represents a side elevation of a self-jacking motor vehicle embodying my invention, two of the wheels being removed and the axles being shown in section; Fig. 2 represents a bottom plan view of the vehicle represented by Fig. 1; Figs. 3 and 4 represent enlargements of a portion of Fig. 1, each showing a jack in position for causing an upward movement of the adjacent wheel when a horizontal movement is imparted to the vehicle; Fig. 5 represents a side view of the portion of the dash shown in section by Fig. 1; Fig. 6 represents an enlargement of a portion of Fig. 3, showing the jack raised to its inoperative position; Fig. 7 represents a section on line 7—7 of Fig. 6, and a plan view of the parts below said line; Fig. 8 represents a section on line 8—8 of Fig. 1, looking toward the left; Fig. 9 represents a section on line 9—9 of Fig. 8, looking toward the left; Fig. 10 represents a section on line 10—10 of Fig. 3; Fig. 11 represents a view similar to a portion of Fig. 8, showing a portion of the jack in a position between its retracted and projected positions.

The same reference characters indicate the same or similar parts in all the views.

My invention hereinafter described is intended chiefly for motor vehicles, and its application to an automobile of ordinary construction is here illustrated. It is to be understood however that the invention is applicable to other wheeled vehicles.

In Figs. 1 and 2 I have illustrated more or less conventionally the chassis or base frame of an automobile designated as a whole by the reference letter $a$, the body of the automobile being designated by the reference letter $b$. $c$ represents the fixed portion of the front axle to which the usual stub axles engaging the steering wheels $d$ are pivotally connected. $e$ represents the rear or driving axle having the driving wheels $f$ and journaled in a bearing $g$ forming a part of the chassis.

The four-wheeled vehicle embodying my invention is preferably equipped with four of the jacks hereinafter described, each jack being located adjacent to one of the wheels and so arranged that it will be caused to raise only the wheel nearest to it when a slight endwise movement is imparted to the vehicle. Each jack is of the same construction as the other jacks, so that a description of one will suffice for all. In describing a single jack I will refer first to one of the jacks to raise one of the steering wheels $d$. To a suitable portion of the base frame, and preferably the fixed front axle $c$, is rigidly connected a carrying member, which as here shown comprises two spaced-apart ears 12, which may be either formed on or adjustably connected with the axle $c$, as indicated by Figs. 3 and 6. 13 represents a pintle engaged with said ears and secured by a head on one end of the pintle and a nut screwed on to the opposite end, as indicated by Fig. 7. The carrying member formed by the ears 12 and pintle 13 carries the jack, which is composed of a strut 14 having at its inner end an orifice 15 through which the pintle 13 passes, and a foot 16 having ears 17, and a transverse pintle 18 engaged with said ears, said pintle passing through an orifice 19 in the outer end of the strut 14. When the jack is not in use it is supported in the raised inoperative position shown by Figs. 6 and 7 by means hereinafter described. The jack is rendered operative by releasing it and allowing its outer end formed by the shoe 16 to drop upon the ground, as shown by Fig. 3, the length of the jack being such that the strut 14 stands in an inclined position when the shoe 16 comes to a bearing on the ground as shown in Fig. 3. The pintle receiving orifices 15 and 19 are preferably of considerably larger diameter than the pintles 13 and 18, as indicated by dotted lines in Figs. 6 and 7, so that the strut is adapted to oscillate freely on the pintle 13 and the shoe is adapted to oscillate freely on the pintle 18. The under side of the shoe constitutes a tread face the area of which is considerably greater than the cross section area of the strut. The weight of the shoe is so disposed that its tread face normally stands in a substantially horizontal position, so that when the jack is swinging from the position shown by Fig. 6 to that shown by Fig. 3 the tread face comes to a full bearing on the ground and automatically conforms thereto.

The jack being in the position shown by Fig. 3, the movement of the vehicle in the direction indicated by the arrow (Fig. 3) will cause the strut to assume a vertical position and lift the adjacent wheel $e$ from the ground, as indicated at the left of Fig. 1. The strut is provided with inner bearing faces 20 and outer bearing faces 21. When the strut is in its raised position the faces 20 and 21 are practically out of contact with the ears 12 and 17, as shown by Fig. 6, but when the strut is dropped to the position shown by Fig. 3 the faces 20 and 21 come to a bearing respectively on portions 20$^a$ and 21$^a$ of the ears 12 and 17, said portions constituting complemental bearing faces which coöperate with the strut faces 20 and 21 in supporting the weight of the vehicle when the strut is in a vertical position, so that the pintles 13 and 18 perform no part of the duty of supporting the weight of the raised portion of the vehicle. There is therefore no liability of the breakage or shearing of the pintles by the weight of the vehicle when the latter is raised. To enable the described jack to be released from its raised position and allowed to drop to contact with the ground, I provide a detent adapted to yieldingly engage the jack, and detent displacing means operable from a point on the vehicle body $e$, and preferably from the dash $g$ in front of the driver's seat. The detent as here shown comprises a vertical rockshaft 22 journaled in a socket or bearing 23 supported by one of the front springs $h$ and provided at its lower end with a detent arm 24 which is normally held yieldingly by a spring 25 in position to engage the strut 14, or as here shown a hooked ear 26 on said strut. The upper end of the rockshaft 22 is provided with a lever 27 to which is attached one end of a flexible pull cord 28 extending over a guide pulley 29 and thence through a tubular guide 30 fixed to the dash $g$. The opposite end of the cord 28 is provided with a handle 31, preferably a ring, adapted to be grasped and pulled by the driver, who is thus enabled to turn the rockshaft 22 against the pressure of the spring 25 and disengage the detent arm 24 from the strut. It will be seen that when the strut is held in a raised inoperative position by the described means for releasably supporting it, the tread face of the foot stands substantially parallel with the strut, as shown by Fig. 6, and that when the strut is released, the angle of said tread face relatively to the strut automatically changes as the foot approaches the ground, as shown by Figs. 3 and 4, said tread face being approximately at a right angle with the strut when it comes to a full bearing on the ground.

As shown by Fig. 2, two of the described jacks are connected with the front anxle $c$, and the detent of each jack is displaced by a pull cord 28. The jacks located adjacent to the rear wheels $f$ are jointed to carrying members 12$^a$ formed on the rear axle bearing $g$ and are practically identical in construction with the front axle jacks above described, the struts 14$^a$ of the rear jacks being somewhat elongated, as will be seen by comparing Figs. 3 and 4. Fig. 4 shows a spring 37, which is connected with the strut 14$^a$ and accelerates the downward movement of the strut when it is released. The detents of the rear struts are displaced by cords 28$^a$, which are guided by pulleys 38 to the pulleys 29 which guide the cords 28.

In Figs. 8, 9 and 11 I show the inner end of the strut 14$^a$ provided with a spherical enlargement 32, which is perforated to receive the pintle 13. 33, 33 represent two concave jaws which are perforated to receive and slide upon the pintle 13, and are pressed against opposite sides of the enlargement 32 by springs 34. Said jaws are connected with the ears 12$^a$ by bent arms 35 and are provided with two pairs of notches 36 adapted to engage opposite sides of the strut 14$^a$ and thus aid in holding the strut either in its raised position or in its vertical position, one pair of notches engaging the strut when it is raised, as indicated by full lines (Fig. 8), and the other pair engaging the strut when it is lowered, as indicated by dotted lines (Fig. 8).

The swinging movement of each jack is in a vertical plane at right angles with the axles, and may therefore be called a "fore and aft" movement. The hinged shoe enables each jack to have an extended bearing on the ground before and during the lifting movement, so that the jack does not form an indentation in the ground and is not liable to sink while in its load-supporting position.

It will be seen that the detent displacing pull cords, converging to the driver's station on the vehicle body, enable the driver to depress either jack, and then start the engine to cause the elevation of the corresponding wheel, before moving from his station, the guides of the different cords being preferably inscribed to enable the driver to selectively drop the jacks.

Having described my invention I claim:

1. The combination with a vehicle, of a carrying member attached to the frame of the vehicle, a strut having pivot openings near its ends, a pivot pin supported by said carrying member and passed through one of said pivot openings, said opening permitting longitudinal movement of the strut, and a foot carrying a pivot pin passed through the pivot opening in the other end of the strut, said opening permitting the foot to move longitudinally of the strut, the sides of said strut having lateral abutment shoulders spaced from each end thereof to engage the carrying member and the foot respectively, to sustain the weight of the vehicle when the foot is in engagement with the ground.

2. In a wheeled vehicle, an oscillatory wheel-raising jack jointed at its inner end to the base frame of the vehicle adjacent to a wheel thereof and adapted to swing fore and aft, and to stand in an inclined position when its outer end bears on the ground, so that a subsequent movement of the vehicle causes the jack to raise the adjacent wheel from the ground, a fixed vertical socket carried by the base frame, a rockshaft adapted to turn in said socket, and having a jack-engaging detent arm, a spring normally holding said arm in its jack-engaging position, and means operable from a point on the vehicle body for turning the rockshaft to displace said arm.

3. In a wheeled vehicle, an oscillatory wheel-raising jack jointed at its inner end to the base frame of the vehicle adjacent to a wheel thereof and adapted to swing fore and aft, and to stand in an inclined position when its outer end bears on the ground, so that a subsequent movement of the vehicle causes the jack to raise the adjacent wheel from the ground, a movable detent carried by the vehicle and adapted to confine the jack in a raised position, means for yieldingly holding said detent in its jack-confining position, a lever connected with said detent, a flexible pull cord connected with said lever and extending to a point on the vehicle body, and means for guiding said cord.

4. In a wheeled vehicle, an oscillatory wheel-raising jack jointed at its inner end to the base frame of the vehicle adjacent to a wheel thereof and adapted to swing fore and aft, and to stand in an inclined position when its outer end bears on the ground, so that a subsequent movement of the vehicle causes the jack to raise the adjacent wheel from the ground, a fixed vertical socket carried by the base frame, a rockshaft adapted to turn in said socket, and having a jack-engaging detent arm, a spring normally holding said arm in its jack-engaging position, a lever attached to said rockshaft, a flexible pull cord attached to said lever and extending to a point on the vehicle body, and means for guiding said cord.

5. In a wheeled vehicle, a plurality of wheel-raising jacks corresponding in number to the wheels and jointed to the base frame, each jack being operatively related to one of the wheels, and each being adapted to swing fore and aft, and to stand in an inclined position when its outer end bears on the ground, a plurality of detents carried by the vehicle and each yieldingly mounted to confine one of the jacks in a raised position, and means operable from a station on the vehicle body for selectively displacing said detents.

6. In a wheeled vehicle, a plurality of wheel-raising jacks corresponding in number to the wheels and jointed to the base frame, each jack being operatively related to one of the wheels, and each being adapted to swing fore and aft, and to stand in an inclined position when its outer end bears on the ground, a plurality of detents carried by the vehicle and each yieldingly mounted to confine one of the jacks in a raised position, said detents being provided with levers, a plurality of pull cords converging from said levers to a station on the vehicle body, and means for guiding said cords.

7. In a wheeled vehicle, a carrying member including spaced ears fixed to the base frame of the vehicle adjacent to a wheel thereof, and a pintle engaged with said ears, a jack comprising a strut having a spherical enlargement at its inner end perforated to receive said pintle and adapted to turn thereon, and spring-pressed concave jaws slidable on said pintle and bearing on opposite sides of said enlargement, said jaws having two pairs of notches formed to engage the strut and aid in confining it in different positions, one pair of notches engaging the strut when it is raised and the other pair when it is lowered.

In testimony whereof I have affixed my signature.

LOUIS C. ZEGA.